J. F. FANSELOW.
TAP CONNECTION FOR MAINS.
APPLICATION FILED FEB. 14, 1919.

1,317,870. Patented Oct. 7, 1919.

Witness:
John Enders

Inventor:
John F. Fanselow
by Fred Gerlach
his Atty.

UNITED STATES PATENT OFFICE.

JOHN F. FANSELOW, OF CHICAGO, ILLINOIS.

TAP CONNECTION FOR MAINS.

1,317,870.

Specification of Letters Patent.

Patented Oct. 7, 1919.

Application filed February 14, 1919. Serial No. 276,913.

*To all whom it may concern:*

Be it known that I, JOHN F. FANSELOW, a citizen of the United States, and a resident of Chicago, in the county of Cook and State of Illinois, have invented certain new and useful Improvements in Tap Connections for Mains, of which the following is a full, clear, and exact description.

The invention relates to devices for making tap connections to water mains and the like and consists in the several novel features hereinafter set forth and more particularly defined by claims at the conclusion hereof.

Figure 1:
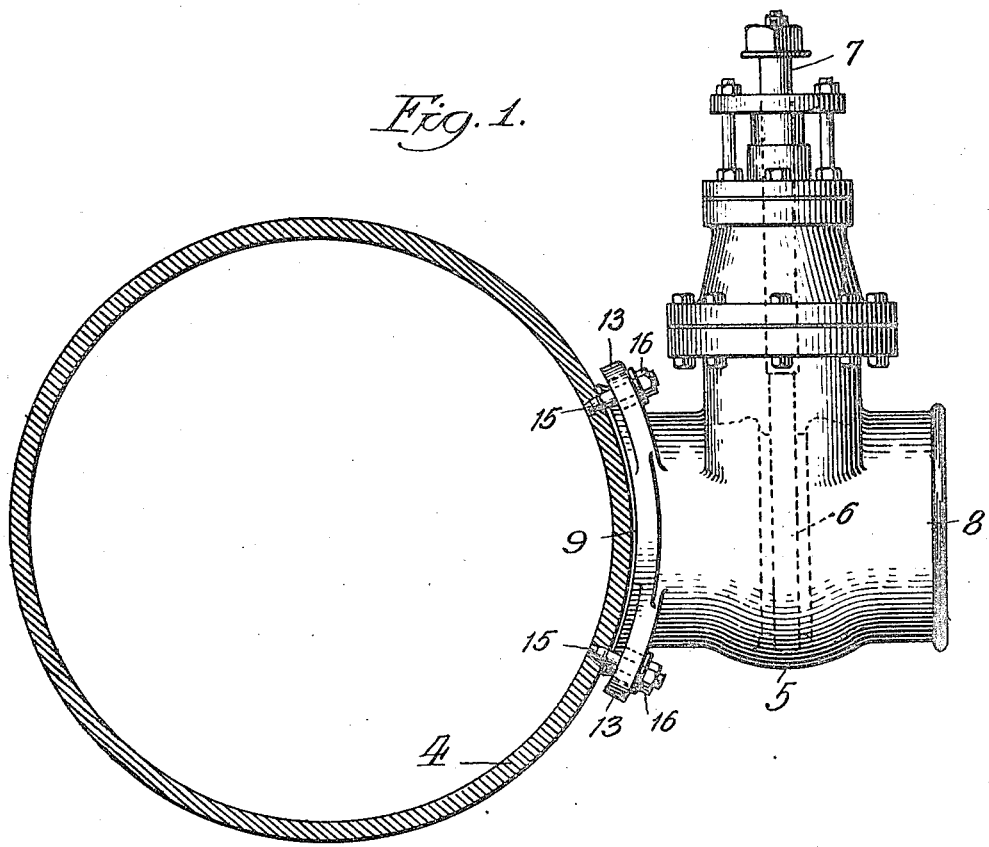
Figure 2:
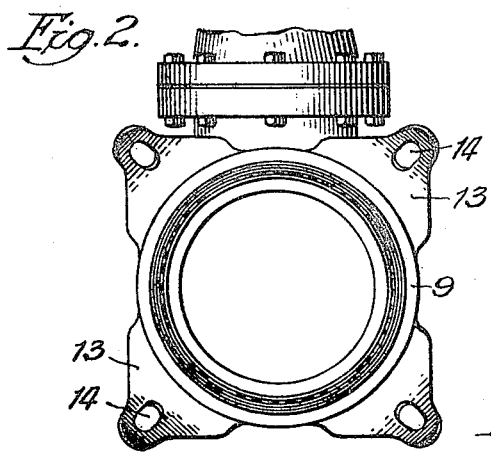
Figure 3:
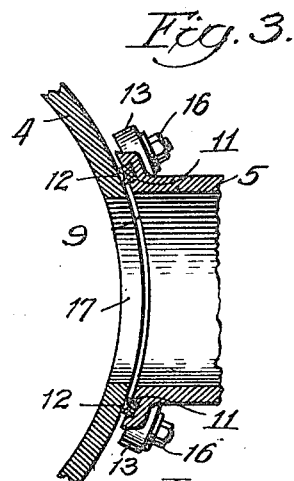
Figure 4:
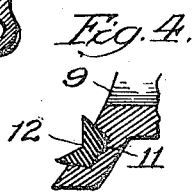

In the drawings: Figure 1 is a side elevation of a connection embodying the invention, the water main being shown in section. Fig. 2 is an end elevation. Fig. 3 is a longitudinal section. Fig. 4 is an enlarged section of the packing ring and its seat.

The invention is designed for making house connections to a water-main 4 after the main has been installed and in which it is necessary to cut out a section of the water main for that purpose. The casing 5 contains a slide valve 6 which is adapted to be raised and lowered by the turning of a stem 7 of a screw for opening and closing the valve, as well understood in the art. The outer end 8 of the valve casing is adapted for connection to a branch pipe leading to the house-supply and the other end is curved, as at 9, to substantially conform to the curvature of the main 4. A groove 11 is formed in the curved face of the end 9 and contains a packing gasket usually of lead which is adapted to form a water-tight connection between the end of the casing and the pipe. To make the connection more effective, the gasket has a V-shaped groove 12 in its operative face which will cause the gasket to spread to form an effective joint between the contiguous surfaces of the main and the end 9 of the casing, when the casing and pipe are drawn together. Lugs 13 are integrally formed with the casing 5 and have openings 14 therein which are adapted to receive bolts having their outer ends provided with nuts 16 for jamming the casing against the main. By providing bolts which have their inner ends tapered, leakage around the bolts is avoided.

In practice, tapered holes with screw threads are cut radially into the main and the bolts 15 are placed therein to plug up the holes. Next, the casing 5 is secured in position by nuts 16 which will draw the casing toward the main and jam the gasket between the casing and the main to form a water-tight joint. Next, the valve 6 is opened and a tool inserted to cut a hole in the main. The valve will then be closed while the house-connection is made to the end of the casing.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a tap-connection for a main, the combination of a valve-casing having one of its ends curved to conform substantially to the periphery of the casing, perforated lugs adjacent the curved end and on the casing and bolts extending through said lugs and adapted to clamp the casing directly onto the main, said bolts and lugs constituting the sole clamping means for securing the casing to the main.

2. In a tap-connection for a main, the combination of a valve-casing having one of its ends curved to conform substantially to the periphery of the main, means for clamping the casing against the main, and a gasket held in the casing and having portions which will be spread between the end of the casing and the main when the casing and main are clamped together.

3. In a tap-connection for a main, the combination of a valve-casing having one of its ends curved to conform substantially to the periphery of the casing, perforated lugs adjacent the curved end and on the casing and bolts extending through said lugs and adapted to clamp the casing directly onto the main, said bolts having tapered screw-threaded portions adapted to pass into the main, said bolts and lugs constituting the sole clamping means for securing the casing to the main.

JOHN F. FANSELOW.